United States Patent
Sanders et al.

(10) Patent No.: US 9,144,026 B2
(45) Date of Patent: Sep. 22, 2015

(54) INTERFACES FOR SETUP OF A TRANSPORT REFRIGERATION SYSTEM AND PROVIDING TRANSPORT REFRIGERATION SYSTEM DIAGNOSTIC INFORMATION TO A USER

(71) Applicants: THERMO KING CORPORATION, Minneapolis, MN (US); ROBERTSHAW CONTROLS COMPANY, Carol Stream, IL (US)

(72) Inventors: Russell Lee Sanders, Minnetonka, MN (US); Mark Daniel Leasure, Eagan, MN (US); Kim Vitkus, Sycamore, IL (US); Mark Johnson, Wheaton, IL (US); Steve Pasek, Bartlett, IL (US)

(73) Assignees: THERMO KING CORPORATION, Minneapolis, MN (US); INVENSYS SYSTEMS, INC., Foxboro, MA (US)

( * ) Notice: Subject to any disclaimer, the term of this patent is extended or adjusted under 35 U.S.C. 154(b) by 197 days.

(21) Appl. No.: 13/848,401

(22) Filed: Mar. 21, 2013

(65) Prior Publication Data
US 2013/0285831 A1    Oct. 31, 2013

Related U.S. Application Data

(60) Provisional application No. 61/613,944, filed on Mar. 21, 2012, provisional application No. 61/787,691, filed on Mar. 15, 2013, provisional application No. 61/613,956, filed on Mar. 21, 2012, provisional
(Continued)

(51) Int. Cl.
G08B 17/00    (2006.01)
G08B 1/08    (2006.01)
(Continued)

(52) U.S. Cl.
CPC ............ *H04W 52/0261* (2013.01); *B60H 1/00* (2013.01); *B60H 1/00014* (2013.01);
(Continued)

(58) Field of Classification Search
CPC ......... F25D 29/008; F25D 3/08; G08B 25/10; G08B 3/10; G08B 17/11; G08B 25/14; E05B 39/00; B65D 88/121
USPC ......... 340/870.1, 585, 539.22, 540, 513, 520, 340/5.32; 220/1.5; 62/457.1
See application file for complete search history.

(56) References Cited

U.S. PATENT DOCUMENTS 5,361,985 A    11/1994    Rein et al.
5,557,096 A    9/1996    Watanabe et al.
(Continued)

FOREIGN PATENT DOCUMENTS

JP    09-126902    5/1997
JP    09-196768    7/1997
(Continued)

OTHER PUBLICATIONS

International Search Report for PCT/US2013/033288 dated Jul. 9, 2013, 8 pages.
(Continued)

*Primary Examiner* — George Bugg
*Assistant Examiner* — Munear Akki
(74) *Attorney, Agent, or Firm* — Hamre, Schumann, Mueller & Larson, P.C.

(57) ABSTRACT

The embodiments described herein are directed to setup of a transport refrigeration system and providing transport refrigeration system diagnostic information to a user. In particular, interfaces on a wireless end node and a network coordinator of a wireless communication system are configured to provide setup and diagnostic functionality of the wireless communication system to a user with limited expertise in wireless communication systems.

5 Claims, 3 Drawing Sheets

Related U.S. Application Data application No. 61/613,949, filed on Mar. 21, 2012, provisional application No. 61/613,952, filed on Mar. 21, 2012, provisional application No. 61/787,719, filed on Mar. 15, 2013, provisional application No. 61/613,946, filed on Mar. 21, 2012.

(51) Int. Cl.

| | | |
|---|---|---|
| *G08B 21/00* | (2006.01) | |
| *G08B 29/00* | (2006.01) | |
| *G08B 23/00* | (2006.01) | |
| *G05B 23/00* | (2006.01) | |
| *B65D 88/00* | (2006.01) | |
| *F25D 3/08* | (2006.01) | |
| *H04W 52/02* | (2009.01) | |
| *F25B 49/00* | (2006.01) | |
| *B60R 16/03* | (2006.01) | |
| *H02J 4/00* | (2006.01) | |
| *G08C 17/02* | (2006.01) | |
| *F25D 29/00* | (2006.01) | |
| *B60H 1/00* | (2006.01) | |

(52) U.S. Cl.
CPC ............... *B60R 16/03* (2013.01); *F25B 49/00* (2013.01); *F25D 29/003* (2013.01); *G08C 17/02* (2013.01); *H02J 4/00* (2013.01); *H04W 52/02* (2013.01); *F25B 2600/07* (2013.01); *Y10T 307/406* (2015.04)

(56) References Cited

U.S. PATENT DOCUMENTS

| | | |
|---|---|---|
| 5,720,171 A | 2/1998 | Osterhoff et al. |
| 5,872,721 A * | 2/1999 | Huston et al. .................. 702/24 |
| 5,907,491 A | 5/1999 | Canada et al. |
| 6,467,694 B1 | 10/2002 | Jerome |
| 6,553,336 B1 | 4/2003 | Johnson et al. |
| 6,593,845 B1 | 7/2003 | Friedman et al. |
| 6,693,511 B1 | 2/2004 | Seal |
| 6,721,546 B1 | 4/2004 | Compton |
| 6,744,352 B2 | 6/2004 | Lesesky et al. |
| 6,863,222 B2 | 3/2005 | Slifkin et al. |
| 6,917,857 B2 | 7/2005 | Rentmeester et al. |
| 6,922,558 B2 | 7/2005 | Delp et al. |
| 7,026,929 B1 | 4/2006 | Wallace |
| 7,260,732 B1 | 8/2007 | Bittner, Jr. |
| 7,612,652 B2 | 11/2009 | Stewart et al. |
| 7,647,078 B2 | 1/2010 | Kim et al. |
| 7,743,616 B2 | 6/2010 | Renken et al. |
| 7,784,707 B2 | 8/2010 | Witty et al. |
| 7,831,282 B2 | 11/2010 | Luebke et al. |
| 7,878,008 B1 | 2/2011 | Mateski et al. |
| 7,903,494 B2 | 3/2011 | Battista |
| 7,940,716 B2 | 5/2011 | Twitchell, Jr. |
| 7,952,485 B2 | 5/2011 | Schechter et al. |
| 7,969,912 B2 | 6/2011 | Jeon et al. |
| 7,992,421 B2 | 8/2011 | Jeftic-Stojanovski et al. |
| 7,995,339 B2 | 8/2011 | Bash et al. |
| 8,035,508 B2 | 10/2011 | Breed |
| 8,047,432 B2 | 11/2011 | Breed |
| 8,115,620 B2 | 2/2012 | Breed |
| 8,248,252 B2 | 8/2012 | Schechter et al. |
| 8,269,627 B2 | 9/2012 | Gore et al. |
| 8,307,667 B2 | 11/2012 | Rusignuolo et al. |
| 2002/0187025 A1 | 12/2002 | Speasl et al. |
| 2005/0232747 A1 | 10/2005 | Brackmann et al. |
| 2006/0202859 A1 | 9/2006 | Mastrototaro et al. |
| 2006/0279424 A1 | 12/2006 | Yoong |
| 2007/0193289 A1 | 8/2007 | Matsui et al. |
| 2007/0267509 A1 | 11/2007 | Witty et al. |
| 2007/0269285 A1 * | 11/2007 | Leggett ..................... 410/100 |
| 2008/0077260 A1 | 3/2008 | Porter et al. |
| 2008/0168807 A1 * | 7/2008 | Dion et al. ..................... 70/94 |
| 2008/0252469 A1 | 10/2008 | Perten et al. |
| 2009/0015400 A1 | 1/2009 | Breed |
| 2009/0037142 A1 | 2/2009 | Kates |
| 2009/0058593 A1 | 3/2009 | Breed |
| 2009/0061897 A1 | 3/2009 | Hamilton et al. |
| 2009/0135000 A1 | 5/2009 | Twitchell, Jr. |
| 2009/0139246 A1 | 6/2009 | Lifson et al. |
| 2009/0140858 A1 | 6/2009 | Gore et al. |
| 2009/0143923 A1 | 6/2009 | Breed |
| 2009/0216497 A1 * | 8/2009 | Schwiers et al. ............. 702/188 |
| 2009/0237258 A1 * | 9/2009 | Heck et al. ................... 340/585 |
| 2009/0272132 A1 | 11/2009 | Rusignuolo et al. |
| 2010/0102136 A1 | 4/2010 | Hadzidedic et al. |
| 2010/0127881 A1 | 5/2010 | Schechter et al. |
| 2010/0176170 A1 | 7/2010 | O'Hare |
| 2010/0250009 A1 | 9/2010 | Lifson et al. |
| 2010/0274604 A1 | 10/2010 | Crilly |
| 2010/0305794 A1 | 12/2010 | Foster |
| 2011/0012731 A1 * | 1/2011 | Stevens ................... 340/539.31 |
| 2011/0059779 A1 | 3/2011 | Thomas et al. |
| 2011/0185749 A1 | 8/2011 | Metzger |
| 2011/0193710 A1 * | 8/2011 | McIlvain et al. ............. 340/585 |
| 2012/0026016 A1 | 2/2012 | Mitchell et al. |
| 2012/0028680 A1 | 2/2012 | Breed |

FOREIGN PATENT DOCUMENTS

| | | |
|---|---|---|
| JP | 2001-324253 | 11/2001 |
| JP | 2003-214747 | 7/2003 |
| JP | 2005-234815 | 9/2005 |
| JP | 2007-228373 | 9/2007 |
| JP | 2008-185241 | 8/2008 |
| WO | 2005/043446 | 5/2005 |
| WO | 2008/153518 | 12/2008 |

OTHER PUBLICATIONS

Written Opinion for PCT/US2013/033288 dated Jul. 9, 2013, 5 pages.
CargoLink Wireless Sensors, Wireless Sensor System Saves Money, Reduces Maintenance and Offers Increased Load Protection, Thermo King Corporation, Copyright 2011, 4 pages.
Installation Manual, Truck and Trailer Edition, WPAN Installation Manual, Thermo King Corporation, Copyright Jan. 2012, 30 pages.
Transport Wireless Technologies Inc., www.transportwireless.com, Copyright 2013, Last accessed Mar. 2012, 1 page.

* cited by examiner

INTERFACES FOR SETUP OF A TRANSPORT REFRIGERATION SYSTEM AND PROVIDING TRANSPORT REFRIGERATION SYSTEM DIAGNOSTIC INFORMATION TO A USER

FIELD

The embodiments disclosed herein relate generally to a transport refrigeration system ("TRS"). More particularly, the embodiments relate to setup of a transport refrigeration system and providing transport refrigeration system diagnostic information to a user.

BACKGROUND

Existing transport refrigeration systems are used to cool containers, trailers, and other similar transport units (typically referred to as a "reefer"). Modern reefers may be efficiently stacked for shipment by ship or rail. Typically, when reefers are shipped by truck, a single reefer is placed on a trailer chassis. When cargo in the container includes perishable products (e.g., food product, flowers, etc.), the temperature of the reefer must be controlled to limit loss of the cargo during shipment.

SUMMARY

The embodiments described herein are directed to setup of a transport refrigeration system and providing transport refrigeration system diagnostic information to a user.

In particular, color coded and blinking light emitting diodes ("LEDs") on a wireless end node and a network coordinator of a wireless communication system for the transport refrigeration system along with pushbuttons on the network coordinator are provided. The color coded and blinking LEDs and the pushbuttons emulate the diagnostic information and procedures used for set-up and troubleshooting of a wired and/or wireless communication system of a transport refrigeration system.

Set-up and troubleshooting procedures can include installing the wireless end nodes, ensuring proper communication between the wireless end nodes and the network coordinator, and providing information regarding the state of the wireless end node being diagnosed. The diagnostic information provided to the user can be provided via the color coded and blinking LEDs and/or data logging stored in the wireless end node, the network coordinator, or in a separate memory storage.

BRIEF DESCRIPTION OF THE DRAWINGS

Referring now to the drawings in which like reference numbers represent corresponding parts throughout.

DETAILED DESCRIPTION

Figure 1:
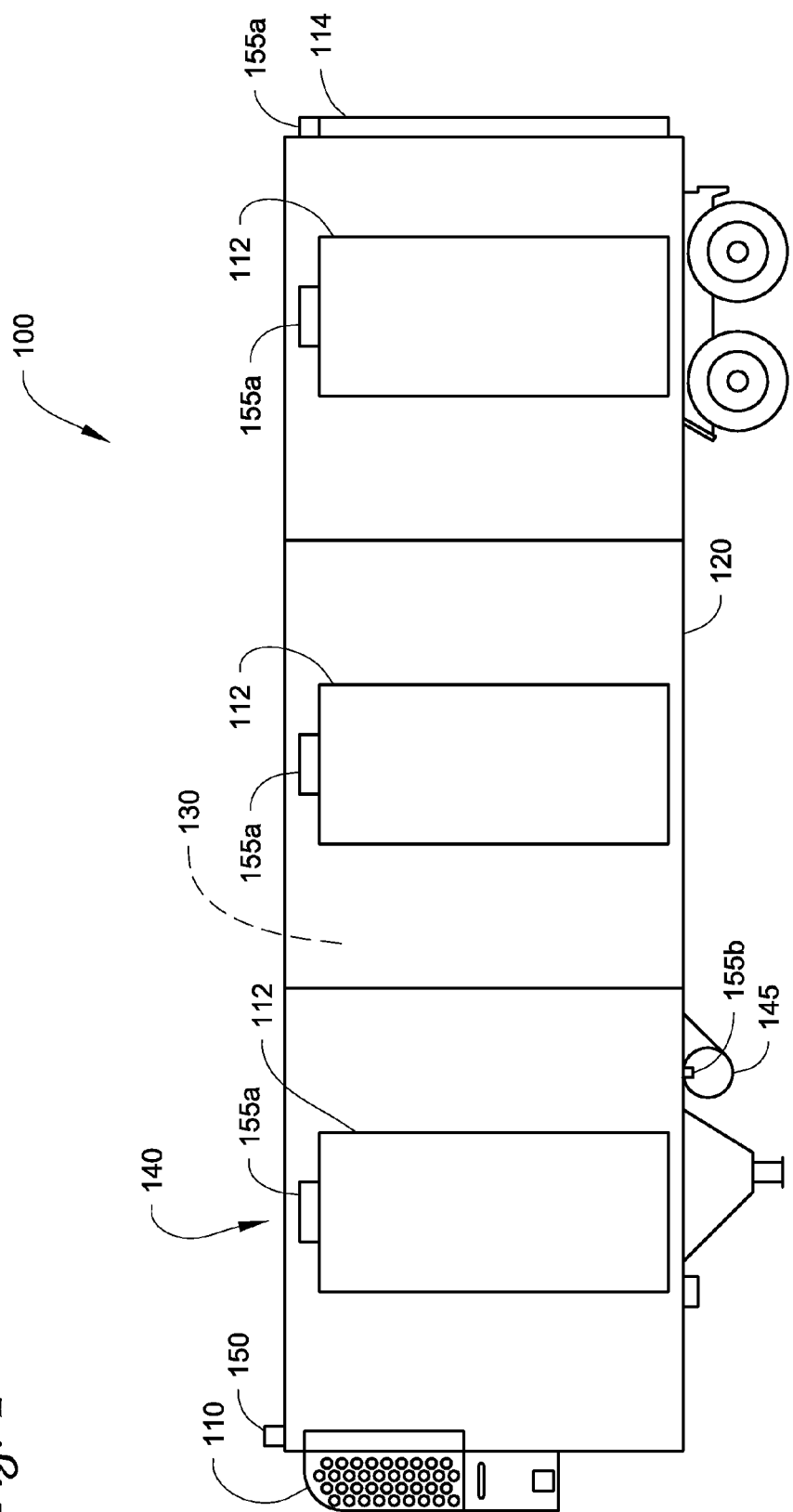
FIG. 1 illustrates a side view of an embodiment of a transport temperature controlled trailer unit with a transport refrigeration system.

The embodiments described herein are directed to setup of a transport refrigeration system and providing transport refrigeration system diagnostic information to a user.

References are made to the accompanying drawings that form a part hereof, and in which is shown by way of illustration of the embodiments in which the methods and systems described herein may be practiced. The term "reefer" generally refers to, for example, a temperature controlled trailer, container, or other type of transport unit, etc. The term "transport refrigeration system" refers to a refrigeration system for controlling the refrigeration of an in internal space of the reefer. The term "wireless communication system" refers to a communication system that is configured to transmit data via a wireless connection and a wired connection over a short distance in a mobile environment, such as, for example, between different points of a reefer that is in transport. The term "wireless end node" refers to an electronic device that is an endpoint of a wireless communication system and is capable of monitoring a property of a transport refrigeration system and transmitting data transmissions to and receiving data transmissions from a network coordinator of the wireless communication system. The term "wired sensor module" refers to an electronic sensor device that is connected via a wired connection to the wireless network coordinator and is capable of monitoring a property of a transport refrigeration system and transmitting data transmissions to and receiving data transmissions from a wireless network coordinator of the wireless communication system. The term "network coordinator" refers to an electronic device that is configured to manage, command, direct and regulate the behavior of one or more wireless end nodes and optionally one or more wired sensor modules of the wireless communication system. The term "TRS control unit" refers to an electronic device that is configured to manage, command, direct and regulate the behavior of one or more TRS refrigeration components (e.g., an evaporator, a blower, a heat exchanger, etc.), a TRS engine, a TRS main battery, a TRS alternate battery (if included in the transport refrigeration system), a TRS fuel tank, etc.

The embodiments described herein enable the efficient use of wireless end nodes in the transportation refrigeration market. There are challenges specific to transport refrigeration systems that most wireless personal area network topologies do not account for, such as the ability to reliably commission a wireless end node to a wireless communication system without cross-commissioning the wireless end node to other wireless communication systems and to do so without being overly complicated. That is, the use of a wireless communication system often requires a certain level of expertise to reliably setup and troubleshoot that may not be readily available at a reefer dealership or by users of the reefer.

The embodiments described herein provide a quick way to setup the wireless communication system and diagnose network problems in the wireless communication system that is similar to or provide a familiar technique to setup and diagnosis techniques of a wired network. The embodiments described herein also eliminate the need for special tools when setting up the wireless communication system such as PC tools.

In particular, the embodiments herein can uses a multicolored and blinking light emitting diode ("LED") to install wireless end nodes to the wireless communication system and to diagnose wireless communication problems. In one embodiment, the LED can emit a green color to signify that the wireless end node or the wireless communication system is operating properly, a yellow color to signify that troubleshooting may be necessary, and a red color to signify when the wireless end node is defective or the wireless communication system is not properly setup. Also, in some embodiments, the interface can change when commissioning the wireless end node to the wireless communication system versus when the wireless end node is operating in a normal operation mode.

FIG. 1 illustrates a side view of a transport temperature controlled trailer unit 100 with a transport refrigeration system 110. The trailer unit 100 is installed on a frame 120 and has a plurality of side doors 112 and a rear door 114. The transport refrigeration system 110 is installed on a side wall of the trailer unit 100. In other embodiments, the transport refrigeration system can be placed at different locations on the trailer unit 100. For example, a generator set of a transport refrigeration system can be mounted under the trailer unit 100 and cold plates of a transport refrigeration system can be mounted on the ceiling of the trailer unit 100. The transport refrigeration system 110 is configured to transfer heat between an internal space 130 and the outside environment.

In some embodiments, the transport refrigeration system 110 is a multizone system in which different zones or areas of the internal space 130 are controlled to meet different refrigeration requirements based on the cargo stored in the particular zone.

It will be appreciated that the embodiments described herein are not limited to trucks and trailer units. The embodiments described herein may be used in any other suitable temperature controlled apparatuses such as a ship board container, an air cargo cabin, an over the road truck cabin, etc. The refrigeration system may be a vapor-compressor type refrigeration system, or any other suitable refrigeration systems that can use refrigerant, cold plate technology, etc.

The transport refrigeration system 110 includes a wireless communication system 140 and a fuel tank 145. The wireless communication system 140 includes a network coordinator (not shown), an antenna 150, and a plurality of wireless end nodes 155. As shown in FIG. 1, the wireless end nodes 155 include a door sensor 155a for each of the side doors 112 and the rear door 114, and a fuel tank level sensor 155b for the fuel tank 145. In some embodiments, the wireless end nodes 155 can also include other types of sensors such as, for example, an air space temperature sensor, a humidity sensor, a cargo temperature center, etc. Also, the wireless end nodes 155 are sealed to prevent failure due to water ingress, extreme temperatures, UV exposure, exposure to oil/solvents, etc. The wireless communication system 140 is configured to communicate information regarding the transport temperature controlled trailer unit 100 to a controller unit (not shown) of the transport refrigeration system 110 for controlling the refrigeration of the internal space 130. In some embodiments, the wireless communication system 140 also includes one or more wired sensor modules (not shown) that are connected to the network coordinator via a wired connection. The wired sensor modules, like the wireless end nodes 155 can include, for example, a door sensor, a fuel tank sensor, an air space temperature sensor, a humidity sensor, a cargo temperature center, etc.

Figure 2:
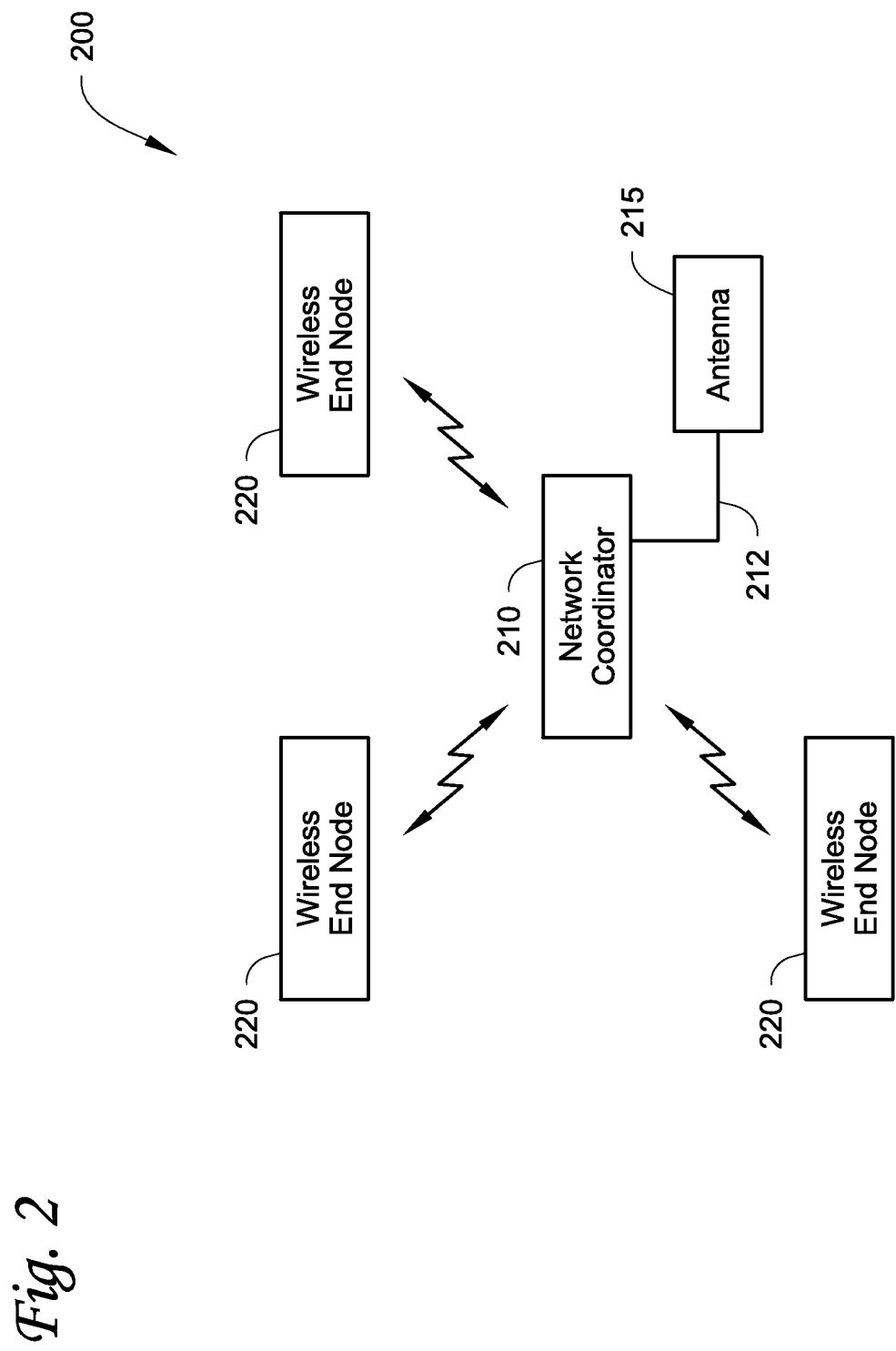
FIG. 2 illustrates a block diagram of one embodiment of a wireless communication system for use in a mobile environment, such as a transport refrigeration system.

Referring to FIG. 2, a block diagram of one embodiment of a wireless communication system 200 for use in a mobile environment, such as a transport refrigeration system, is described. The wireless communication system 200 includes a network coordinator 210, an antenna 215 and a plurality of wireless end nodes 220. The wireless communication system 200 can be a wireless personal area network ("WPAN") that uses, for example, a ZigBee communication protocol. In other embodiments, other types of communication protocols can be used such as, for example, Bluetooth or any other type of wireless communication protocol that allows for transmission of data between different points of a reefer during transport.

In some embodiments the network coordinator 210 is a WPAN module that is configured to be installed in a control box (not shown) of a transport refrigeration system. The network coordinator 210 is configured to transmit to and receive data from each of the plurality of wireless end nodes 220 via the antenna 215 using a short distance wireless communication protocol such as, for example ZigBee, Bluetooth, etc. Also, the network coordinator 210 is configured to connect to a TRS control unit of a transport refrigeration system stored in the control box.

The antenna 215 is a weatherproof antenna that is configured to be installed outside of the control box and is connected to the network coordinator 210 via a wired communication link 212 such as, for example, a coaxial cable. In some embodiments, the antenna 215 can be configured to be installed inside the control box with the network coordinator 210. Also, in some embodiments, the antenna 215 can be an embedded onto a printed circuit board of the network coordinator 210 or a TRS control unit of the transport refrigeration system.

Each of the plurality of wireless end nodes 220 is configured to transmit and receive information with the network coordinator 210 using a short distance wireless communication protocol such as, for example ZigBee, Bluetooth, etc. In some embodiments, one or more of the wireless end nodes 220 are industrialized by using a sealed housing (not shown) to prevent failure due to water ingress, extreme temperatures, UV exposure, exposure to oil/solvents, etc.

Each of the plurality of wireless end nodes 220 can be, for example, a door sensor, a fuel tank level sensor, an air space temperature sensor, a humidity sensor, a cargo temperature center, etc. When the wireless end node 220 is a door sensor, the wireless end node 220 is configured to transmit a data signal to the network coordinator 210 when a door of the transport refrigeration system being monitored by the wireless end node 220 is opened or closed. When the wireless end node 220 is a fuel tank level sensor, the wireless end node 220 is configured to transmit a data signal to the network coordinator 210 indicating the level of a fuel tank of a transport refrigeration system. When the wireless end node 220 is an air space temperature sensor, the wireless end node 220 is configured to transmit a data signal to the network coordinator 210 indicating the temperature of an internal space of a reefer. When the wireless end node 220 is a humidity sensor, the wireless end node 220 is configured to transmit a data signal to the network coordinator 210 indicating the humidity of an internal space of a reefer. When the wireless end node 220 is a cargo temperature sensor, the wireless end node 220 is configured to transmit a data signal to the network coordinator 210 indicating the temperature of cargo stored in the reefer.

Figure 3:
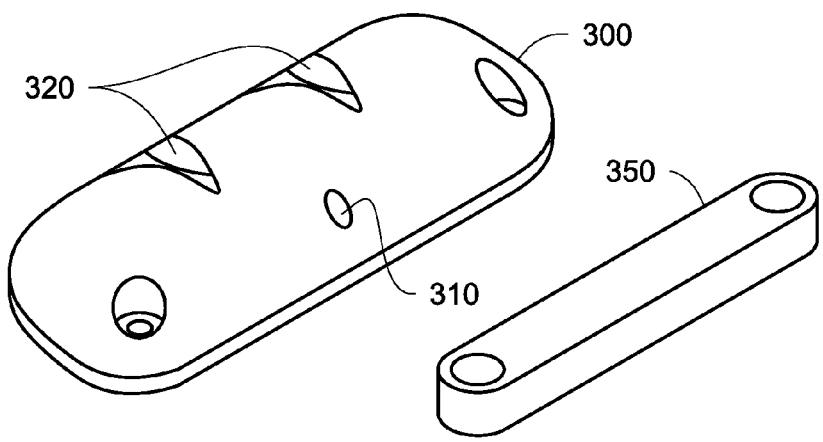
FIG. 3 illustrates a perspective view of one embodiment of a wireless end node and a magnet used to interface with the wireless end node.

FIG. 3 illustrates a perspective view of one embodiment of a wireless end node 300 and a magnet 350 used to interface with the wireless end node. The wireless end node 300 includes a multicolored and blinking LED 310. In this embodiment, the wireless end node 300 also includes temperature sensors 320 for monitoring the temperature of the transport refrigeration system where the wireless end node 300 is installed. By swiping the magnet 350 in front of the wireless end node 300, a user can interact with the wireless end node 300 to setup the wireless end node 300 to a wireless communication system (not shown) or diagnosing issues with the wireless end node 300 or the wireless communication system that the wireless end node 300 is connected to. In one embodiment, the LED 310 emits a green color to signify that the wireless end node 300 or the wireless communication system is operating properly, a yellow color to signify that troubleshooting of the wireless end node 300 may be necessary, and a red color to signify when the wireless end node 300 is defective or the wireless communication system is not properly setup. Also, in some embodiments, the interface can change when commissioning the wireless end node to the wireless communication system versus when the wireless end node is operating in a normal operation mode.

Figure 4:
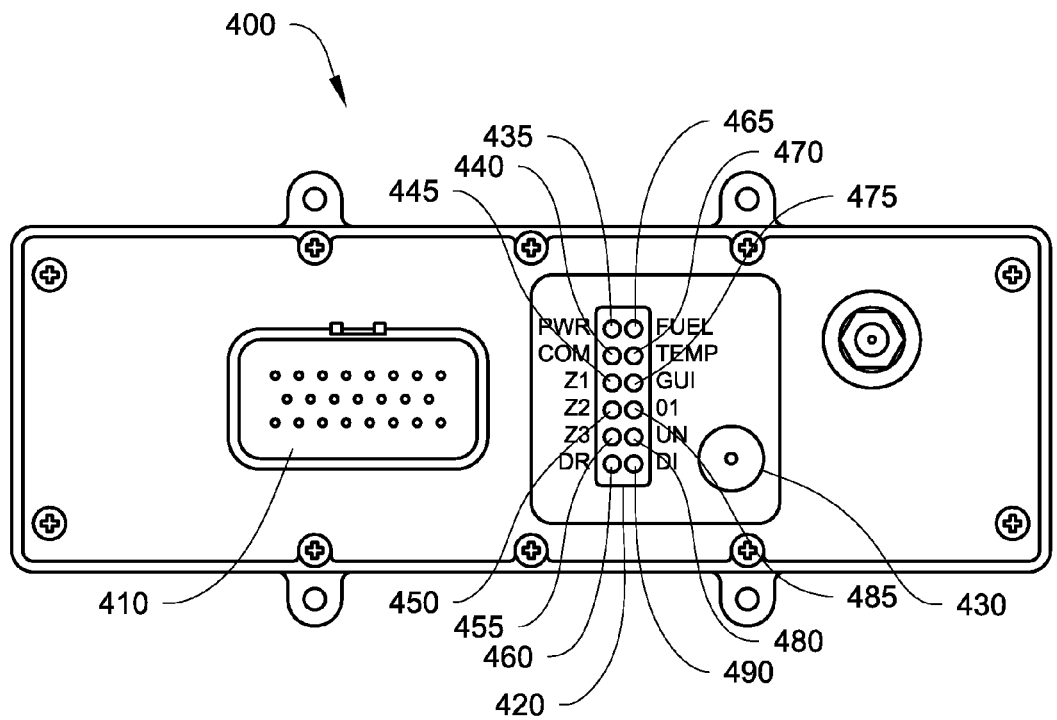
FIG. 4 illustrates a front view of one embodiment of a network coordinator for use with a transport refrigeration system.

FIG. 4 illustrates a front view of one embodiment of a network coordinator 400 for use with a transport refrigeration system. The network coordinator 400 includes a connector 410, a display 420, a pushbutton 430 and an antenna connector 440. The connector 410 is configured to allow a computer to connect to the network coordinator 400 and retrieve data logging information stored in a memory storage of the network coordinator 400. The antenna connector 440 is configured to allow an antenna to connect to the network coordinator 400 and allow the network coordinator to transmit data to and receive data from one or more wireless end nodes (not shown). The display 420 includes text and LED lights to communicate information regarding the network coordinator 400 and a wireless communication system, that the system control 400 is part of, to a user. The pushbutton 430 is configured to allow a user to interface with the network coordinator 400 in order to setup the wireless communication system and diagnose issues occurring within the wireless communication system.

In one embodiment, the display 420 includes a power/status LED 435, a proximity pairing LED 440, a zone 1 LED 445, a zone 2 LED 450, a zone 3 LED 455, a door LED 460, a fuel LED 465, a temperature LED 470, a graphical user interface LED 475, a unpair LED 480 and modifiable LEDs 485, 490.

The interfaces provided by the wireless end node 300 shown in FIG. 3 and the network coordinator 400 shown in FIG. 4 provide the following setup and diagnosis functionality: error handling; commissioning and decommissioning of wireless end nodes of the wireless communication system; diagnosing issues such as sensor verification, door status verification, fuel status verification, etc.; self-diagnostic functionality for determining a system state of the wireless communication system; and configuration of parameters including such as door configuration of the reefer, door polarity, door timeout, fuel input source, proximity pairing, factory defaults, etc.

Examples of the above setup and diagnosis functionality that can be performed by a wireless end node and/or a network coordinator of a communication network of a transport refrigeration system are described below.

2.1 Commissioning

Commissioning is the process of associating a wireless end node with a particular portion of the transport refrigeration system for the wireless end node to be detected and used by the wireless communication system.

2.1.1 A user can bring a wireless end node to be commissioned near to the network coordinator where there is a high signal strength to avoid unintended commissioning of other wireless end nodes.
 2.1.2 A user can press and release the pushbutton on network coordinator until the correct, for example, Zone/Fuel/GUI LED is illuminated on the display of the network coordinator. Repeated presses can cycle through all zones plus a 'Nothing Selected' position before starting over at the top.
 2.1.3 Using a magnet (e.g., a door magnet), a user can activate the wireless end node to be commissioned. For example, in some embodiments, the magnet can be waved 3 times within, for example, about a 2 second interval next to the wireless end node. When the wireless end node has recognized, for example, about 2 seconds of silence, 3 activations, and about 2 more seconds of silence, a request to join the wireless communication system can be provided.

For example, in one embodiment, a wireless end node can be commissioned by:
 1. A user quickly bringing the magnet and wireless end node together (<~0.25 seconds) and then remove the magnet.
 2. Wait about two seconds. While waiting, the LED on the wireless end node can be off.
 3. After about two seconds, the LED on the wireless end node can quickly flash.
 4. *A user can then bring together the magnet and the wireless end node. When the magnet is recognized by the wireless end node, the LED can be turned off.
 5. *A user can then remove the magnet from the wireless end node to cause the LED to quickly flash.
 6. *A user can repeat #4 and #5 two more times for a total of three swipes.
 7. If successful, the LED on the wireless end node can be turned off. A user can place the network coordinator in discovery mode using the pushbutton (or before beginning the sequence).
 8. When pairing is complete and successful, the LED on the wireless end node can flash, for example, 4 times for about 4 seconds.
 9. If unsuccessful, the LED on the wireless end node can continue to quickly flash and the user can repeat the sequence starting at #1.
 *For items #4-#6, in some embodiments, the user can be required to finish the sequence in about 6 seconds to complete.
 2.1.4 The network coordinator can accept the commissioning request if the signal strength is high enough and if the commissioning timeout has not occurred.
 2.1.5 If commissioning was successful, the LED on the wireless end node can turn, for example, Green and a Zone LED on the display of the network coordinator can blink for, for example, about 4 seconds.
 2.1.6 The zone LED on the display of the network coordinator can remain illuminated for another wireless end node association and the commissioning timer can restart.
 2.1.7 In some embodiments, a user can repeat starting at step 3 if another wireless end node is to be added to the same zone.
 2.1.8 In some embodiments, a user can repeat starting at step 2 if a wireless end node is to be added to another zone.

2.2 Device Commission Count (Diagnostic 1)

This procedure can report the number of wireless end nodes in each zone of the wireless communication system. This can be used to verify the commissioned device count regardless of whether the wireless end nodes are responding.

For example, in one embodiment, a device commission count diagnostic can be performed by the network coordinator and one or more wireless end nodes as follows:
 2.2.1 A user can press and release the pushbutton on the network coordinator until a Diagnostic LED on the display of the network coordinator is illuminated.

2.2.2 A user can press and hold the pushbutton as the LED on the display of the network coordinator turns off. A user can then release the switch when the LED on the display of the network coordinator blinks 1 time.

2.2.3 The Diagnostic LED on the display of the network coordinator can blink, for example, 1 time every about two seconds go indicate a Diagnostic 1 activity. This mode can exit, for example, after 60 seconds when no activity is detected.

2.2.4 A user can then press and release the pushbutton on the network coordinator until the desired Zone/Fuel/GUI LED on the display of the network coordinator is illuminated.

2.2.5 The Zone/Fuel/GUI LED on the display of the network coordinator can then begin blinking in sync with the Diagnostic LED on the display of the network coordinator with one blink per wireless end node. If no wireless end nodes have been commissioned, the LED on the display of the network coordinator can, for example, blink constantly at a much faster rate.

2.2.6 A user can then, for example, press and release the pushbutton on the network coordinator to step through the other Zone/Fuel/GUI on the display of the network coordinator.

2.2.7 To immediately exit this mode, a user can, for example, press and hold the pushbutton on the network coordinator until the Diagnostic LED on the display of the network coordinator is fully lit. This can exit the mode. The LED on the display of the network coordinator can then turn off when the switch is released.

2.3 Device Detected Count (Diagnostic 2)

This procedure can report the number of wireless end nodes in each zone of the wireless communication system that have been communicating. Wireless end nodes can be configured to communicate infrequently to prolong battery life so the results can be based on if the last communication occurred within the expected interval.

For example, in one embodiment, a device detected count diagnostic can be performed by the network coordinator and one or more wireless end nodes as follows:

A user can, for example, press and release the pushbutton on the network coordinator until the Diagnostic LED on the display of the network coordinator is illuminated.

A user can then, for example, press and hold the pushbutton on the network coordinator as the LED on the display of the network coordinator turns off. A user can then, for example, release the pushbutton when the LED on the display of the network coordinator, for example, blinks 2 times rapidly.

The Diagnostic LED on the display of the network coordinator can, for example, double blink about every two seconds indicating a Diagnostic 2 activity. This mode can, for example, exit after ~60 seconds when no activity is detected by the network coordinator.

A user can, for example, press and release the pushbutton on the network coordinator until the desired Zone/Fuell/GUI LED on the display of the network coordinator is illuminated.

The Zone/Fuel/GUI LED can, for example, begin blinking in sync with the Diagnostic LED with, for example, one blink per device. If no devices have been detected within a communications interval, the LED can then, for example, blink constantly at a much faster rate.

A user can then press and release the pushbutton on the network coordinator to step through the other Zone/Fuel/GUI on the display of the network coordinator.

2.3.1 To immediately exit this mode, a user can press and hold the pushbutton until the Diagnostic LED on the display of the network coordinator is fully lit to instruct the network coordinator to exit the mode. The LED on the display of the network coordinator can turn off when the pushbutton is released.

2.4 Link Quality (Diagnostic 3)

This procedure can report the lowest Link Quality of wireless end nodes that have been commissioned for in each zone. Wireless end nodes can communicate infrequently to prolong battery life so the results can be based on the last communications. In general, for example, an average value for the last hour can be used. If the wireless end node was recently commissioned, the average can be over the number of available samples.

For example, in one embodiment, a link quality diagnostic can be performed by the network coordinator and one or more wireless end nodes as follows:

2.4.1 A user can, for example, press and release the pushbutton on the network coordinator until the Diagnostic LED on the display of the network coordinator is illuminated.

2.4.2 A user can, for example, press and hold the pushbutton until the LED on the display of the network coordinator turns off. The user can then, for example, release the pushbutton when the LED on the display of the network coordinator, for example, blinks 3 times rapidly.

2.4.3 The Diagnostic LED on the display of the network coordinator can, for example, triple blink about every two seconds indicating Diagnostic 3. This mode can exit after 60 seconds with no activity.

2.4.4 A user can, for example, press and release the pushbutton on the network coordinator until the desired Zone/Fuel/GUI LED is illuminated on the display of the network coordinator.

2.4.5 The Zone/Fuel/GUI LED on the display of the network coordinator can, for example, begin blinking in sync with the Diagnostic LED on the display of the network coordinator with, for example, 1 to 4 blinks as an indication of Link Quality of the weakest signal in that zone. More blinks, for example, can be the result of a better signal. If the received signal strength is undetectable, the LED on the display of the network coordinator can blink constantly at a much faster rate. Note: This may be due to a previously commissioned wireless end node which is no longer present.

2.4.6 A user can, for example, press and release the pushbutton on the network coordinator to step through the other Zone/Fuel/GUI on the display of the network coordinator.

2.4.7 To immediately exit this mode, a user can, for example, press and hold the pushbutton until the Diagnostic LED on the display of the network coordinator is fully lit. This can exit the mode. The LED on the display of the network coordinator can turn off when the switch is released.

2.5 Clear Zone (Decommissioning Diagnostic)

This procedure can remove all wireless end nodes commissioned from a zone. This may be necessary if no PC or GUI device is available to remove a bad sensor. After clearing the zone, all wireless end nodes for that zone may have to be re-commissioned.

For example, in one embodiment, a clear zone decommissioning diagnostic can be performed by the network coordinator and one or more wireless end nodes as follows:

A user, can for example, press and release the pushbutton on the network coordinator until the Diagnostic LED on the display of the network coordinator is illuminated.

A user can then, for example, press and hold the pushbutton until the LED on the display of the network coordinator turns off. A user can, for example, continue holding the pushbutton down as the Diagnostic LED on the display of the network coordinator, for example, blinks once, twice, etc. A user can then release the pushbutton when the Commissioning LED on the display of the network coordinator, for example, starts blinking rapidly.

The Diagnostic LED on the display of the network coordinator can then be lit and the Commissioning LED on the display of the network coordinator can, for example, be blinking rapidly to indicate the Clear Zone Mode. This mode can exit after 60 seconds with no activity.

2.5.1 A user can, for example, press and release the pushbutton on the network coordinator until the desired Zone/Fuel/GUI LED is illuminated on the display of the network coordinator.

2.5.2 A user can, for example, press and hold the pushbutton. Both the Zone/Fuel/GUI LED and the Commissioning LED on the display of the network coordinator can then, for example, begin blinking rapidly until the Commissioning LED on the display of the network coordinator turns off to remove each wireless end node from the wireless communication system.

2.5.3 To exit this mode without clearing a zone, wait, for example, about 60 seconds or following this procedure, a user can, for example, press and release the pushbutton on the network coordinator until the Zone/Fuel/GUI LED on the display of the network coordinator is lit. A user can, for example, press and hold the pushbutton until the Commissioning LED on the display of the network coordinator stops blinking.

2.6 Wireless End Node User Interface

For example, in one embodiment, a wireless end node user interface can be provided as follows:

2.6.1 Table 1 defines the various states of the LED of the wireless end node according to one embodiment:

TABLE 1

| Event | Failure Condition | Expected Frequency | Normal Operating Condition | LED Color Used | Blink/ Rate | Non-commissioned On the shelf | Commissioning | Commissioned and Installed |
|---|---|---|---|---|---|---|---|---|
| Commissioning Event | No | Low | No | Green | 1, time = 1, for 4 seconds 1, time = 1, for 30 seconds | | Rapid blinking of green LED at a rate of 3 pulses per second during commissioning. Commissioning time window of 30 seconds. Timing window can be changed. | Successful commissioning - the green LED blinks once a second for 4 seconds and turns off. Unsuccessful - the green LED can continue blinking. Max blink time 30 seconds. |
| Decommissioning Event/Factory reset[4] | No | Low | No | Green/ Yellow Green/ Red | 3 times every 15 seconds 3 times every 15 seconds | NA | NA | Alternating green and yellow LED blinks 3 pulses per second for 15 seconds during decommissioning and then turns off. Successful Decommissioning/ Factory Reset - Alternating green and red LED 1 pulses per second for 4 seconds and then turns off. |
| Door Open | No | High | Yes | Green | 1 blink | Alternating green and red LED blinks 1 pulses per second for 4 seconds during decommissioning and then turns off. | NA | The green LED blinks once. |
| Door Closed | No | High | Yes | Green | 1 blink | NA | NA | The green LED blinks once. |
| Firmware Update In Progress | No | Low | No | Yellow | 4/second | NA | NA | Alternating yellow LED blinks 4 pulse per second repeated every 10 seconds.[3] |
| Door Ajar Error[5] | No | Low | No | Yellow | 1, event based | NA | NA | Triggered by a door open event the yellow LED blinks 1 times after the standard door open event. |
| Excessive Packet Loss, Note: need to define trigger | No | Low | No | Yellow | 2, event based | NA | Rapid blinking of yellow LED.[2] | Triggered by a door open event the yellow LED blinks 2 times after the standard door open event. |

TABLE 1-continued

| Event | Failure Condition | Expected Frequency | Normal Operating Condition | LED Color Used | Blink/Rate | Non-commissioned On the shelf | Commissioning | Commissioned and Installed |
|---|---|---|---|---|---|---|---|---|
| Commissioned, but no acknowledgement from network coordinator during last 2 timed report periods. | No | Low | No | Yellow | 3, event based | NA | NA | Triggered by a door open event the yellow LED blinks 3 times after the standard door open event. Note: Event based to reduce chance of all sensors waking up to blink if network coordinator is bad or is not available. |
| Low battery | Yes | Low | No | Red | 1/15 seconds | Blink red LED 1 pulse every after a door open event trigger.³ | Blink red LED once pulse every 5 seconds.² | The red LED blinks once every 15 seconds. |
| Wireless end node (e.g. Door Sensor) error (input out of range) | Yes | Low | No | Red | 2/15 seconds | Blink red LED 2 pulse every after a door open event trigger.³ | Blink red LED 2 pulses every 5 seconds² | The red LED blinks 2 times every 15 seconds. |
| Wireless end node (e.g., Temperature Sensor) error (either open or shorted) | Yes | Low | No | Red | 3/15 seconds | Blink red LED 3 pulses after a door open event trigger.³ | Blink red LED 3 pulses every 5 seconds² | The red LED blinks 3 times every 15 seconds. |

[1]NA—Not Applicable
[2]These signals can override the commissioning event LED output.
[3]These signals can override all other event LED outputs.
[5]Note: choose best algorithm to extend battery life of wireless end node 3. Diagnostics For example, in one embodiment, diagnostics can be performed by the network coordinator and one or more wireless end nodes as follows:

3.1 Sensor Verification

The number of sensors paired to a zone can be verified from a top level diagnostic menu of the network coordinator. A user can, for example, press the pushbutton of the network coordinator repeatedly until the Diagnostic LED on the display of the network coordinator is lit. This is the top level diagnostic menu.

Indication: In some embodiments, the Diagnostic LED on the display of the network coordinator can be lit but the Door, Temp, and Fuel LEDs cannot light.

Each Zone LED on the display of the network coordinator can pulse in sequence to represent the number of wireless end nodes paired. Note that paired wireless end nodes can include missing wireless end nodes. For example, in one embodiment:

| Zone LED Activity | Number of Sensors |
|---|---|
| None | 0 |
| 1 Pulse | 1 |
| 2 Pulses | 2 |
| 2 PULSES | 3 |

3.2 Door Status Verification

A user can, for example, select (press, hold, release) the pushbutton of the network coordinator from the diagnostic top level menu to enter the Door Sensor 1 Status level.

Indication: For example, the Diagnostic LED on the display of the network coordinator can be lit and the Door LED can pulse 1 time at the beginning of the display sequence.

Each Zone LED on the display of the network coordinator can, for example, indicate the status of the first door wireless end node in each zone. This is not guaranteed to be the first wireless end node installed for the zone. For example, in one embodiment:

| Zone LED Activity | Sensor Status |
|---|---|
| None | No Sensor Paired |
| 1 Pulse | Closed |
| On 2 Seconds | Open |
| 5 Pulses | Missing |

This can be the actual status of the door. If the door has timed out in the open state or if it is missing, the network coordinator can act as if the door is closed.

A wireless end node that is reported missing may have fallen off the reefer, be out of range, or have stopped functioning.

3.3 Fuel Status Verification

A user can, for example, select (press, hold, release) the pushbutton on the network coordinator from the Door Sensor 2 Status level to enter the Fuel Status level.

Indication: The Diagnostic LED on the display of the network coordinator can be lit and the Fuel LED on the display of the network coordinator can, for example, pulse 1 time at the beginning of the display sequence.

| Zone LED Activity | Sensor Status |
|---|---|
| None | No Sensor Paired |
| 1 Pulse | Tank is ≤25% |
| 2 Pulses | Tank is ≤50% |
| 3 Pulses | Tank is ≤75% |

-continued

| Zone LED Activity | Sensor Status |
|---|---|
| On 2 Seconds | Tank is ≤100% |
| 5 Pulses | Missing |

3.4 Exiting Diagnostics

The user can navigate out of the Diagnostic Menu at any time with a short press of the pushbutton on the network coordinator.

3.5 Low Battery

The user can determine whether the wireless end node or a battery of the transport refrigeration system is low.

3.6 Low Link Quality

A PC based software can be used to verify link quality.

3.7 The Use of LED Indicators on the Display of the Network Coordinator can be Used on Each Zone to Aid in Installation Verification and Troubleshooting Process. Below is the LED Indicator to Function Table:

| LED Indicators | |
|---|---|
| LED | Function |
| 1 | Power/Status |
| 2 | Pair |
| 3 | Zone 1 |
| 4 | Zone 2 |
| 5 | Zone 3 |
| 6 | Door |
| 7 | Fuel |
| 8 | Temp |
| 9 | GUI |
| 10 | Option |
| 11 | UnPair |
| 12 | Diagnostic |

4. Feature Configuration 4.1 Requirements

The network coordinator can be installed in a wide variety of differing controller configurations. To adapt to these differing interface conditions a feature list can be electronically configurable.

4.2 Entering Feature Configuration Mode

A user can, for example, press and hold the pushbutton of the network coordinator when the Power/Status LED on the display of the network coordinator is lit.

Indication: The Power/Status LED on the display of the network coordinator can turn off. Sequentially, each configuration selection LED on the display of the network coordinator can light. These are the features which, for example, can be edited.

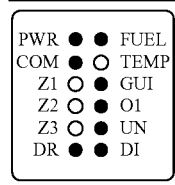

| LED | Label | Feature Configuration |
|---|---|---|
| Door | DR | Door Polarity Selection |
| | | Door Timeout Enable |
| Fuel | FUEL | Fuel Input Source |
| Pair | COM | Proximity Pairing |
| Unpair | UN | Factory Defaults |
| Power/Status | PWR | None |

A user can release the pushbutton when the feature to configure is selected. There can be, for example, two seconds per selection. If no feature is selected, the sequence can stop at Power/Status.

4.3 Exiting Feature Configuration Mode

A user can short press the pushbutton on the network coordinator to exit the configuration mode. This can be like a normal menu navigation. Button selection (press, hold, release) can be required to change the configuration.

The normal HMI timeout can also apply to a configuration mode. If a timeout occurs, any configuration changes made prior to the timeout can be lost.

4.4 Door Configuration

Indication: The Door LED on the display of the network coordinator can indicate the current configuration with some number of LED blips as shown in the following table:

| # Blips | Door Polarity | Door Open Timeout |
|---|---|---|
| 1 | Open = High | Enable |
| 2 | Open = Low | Enable |
| 3 | Open = High | Disable |
| 4 | Open = Low | Disable |

A user can, for example, select (press, hold, release) the pushbutton on the network coordinator to change the current configuration. This can be repeated until the required configuration is displayed.

A short button press can exit the configuration mode and the last displayed selection can be used as the working configuration.

4.5 Fuel Configuration

Indication: The Fuel LED on the display of the network coordinator can indicate the current configuration with some number of LED blips as shown in the following table:

| # Blips | Fuel Configuration |
|---|---|
| 1 | Output ~3.5 Volts |
| 2 | ~1-4 Volt Input |
| 3 | ~0-5 Volt Input |

A user can, for example, select (press, hold, release) the pushbutton on the network coordinator to change the current configuration. This can be repeated until the required configuration is displayed.

A short button press of the pushbutton on the network coordinator can exit the configuration mode and the last displayed selection can be used as the working configuration.

If a wireless end node that functions as a Fuel Sensor is paired and functioning, the network coordinator Fuel Output can be, for example, in the ~1-4 Volt range unless the 0-5 Volt range has been selected.

If a wireless end node that functions as a Fuel Sensor is paired and missing, the network coordinator Fuel Output can be a constant ~3.5 Volts.

A short button press of the pushbutton of the network coordinator can exit the configuration mode and the last displayed selection can be used as the working configuration.

4.6 Proximity Pairing Configuration

Indication: The Pair LED on the display of the network coordinator can indicate the current configuration with some number of LED blips as shown in the following table:

| # Blips | Configuration |
|---|---|
| 1 | Off |
| 2 | Low |

-continued

| # Blips | Configuration |
|---------|---------------|
| 3 | Medium |
| 4 | High |

Proximity pairing can set the required signal level used for pairing. If unintentional pairing occurs to sensors on different trailers, the Proximity Pairing can be increased.

A user can, for example, select (press, hold, release) the pushbutton of the network coordinator to change the current configuration. This can be repeated until the required configuration is displayed.

A short button press of the pushbutton of the network coordinator can exit the configuration mode and the last displayed selection can be used as the working configuration.

4.7 Factory Defaults Configuration

Indication: The Unpair LED on the display of the network coordinator can indicate the current configuration with some number of LED blips as shown in the following table:

| # Blips | Configuration |
|---------|---------------|
| 1 | No Change |
| 2 | Factory Defaults |

A user can, for example, select (press, hold, release) the pushbutton of the network coordinator to change the current configuration. This can be repeated until the required configuration is displayed.

Restoring Factory Defaults can clear all pairing information from the network coordinator.

A short button press of the pushbutton can exit the configuration mode and the last displayed selection can be used as the working configuration.

4.8 Door Status Output

A user can, for example, press the pushbutton of the network coordinator repeatedly until the Door LED on the display of the network coordinator is lit. The application status can then be displayed by the Zone LED for each zone. This can aid in installation to show door opening and closing events. Open can result in the Zone LED being on and Closed can result in the Zone LED being off regardless of door polarity configuration.

In some embodiments, an "Application Status" message can indicate that missing sensors are ignored, stuck open sensors are ignored, and all remaining sensors are required to be closed to report closed.

4.9 The Wireless End Nodes can be Commissioned by the Use of a Momentary Switch and a Multi Colored LED Indicator, Following an E-Mode Commissioning Zigbee RF4CE Profile.

4.9.1 In some embodiments, commissioning can be established from an update serial port of the network coordinator, for example, for large installations that multiple reefers could be using commissioning processes simultaneously.

4.9.2 In some embodiments, the transport refrigeration system can have three door zones (with up to 2 separate doors per zone), three temperature sensors, one fuel sensor and one handheld device.

4.9.3 In one embodiment, high level commissioning is shown in the process diagram below in the diagram below:

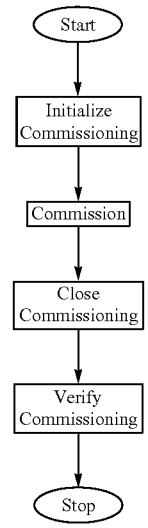

High Level Commissioning

| Exception | Behavior | Notes |
|-----------|----------|-------|
| Lost Communication | Ack back off scheme route errors frequency agility Enable LED Behavior | |
| HW malfunction | Enable LED Behavior Temperature sensor | Bad wireless end node, switch, A/D etc . . . |
| | reed switch | Redundant reed switch would help here Continue with normal |

-continued

| Exception | Behavior | Notes |
|---|---|---|
| Low Battery | | operation |
| | Disable commissioning mode | |
| | Disable all other LED's | |
| | Deterministic battery life calculation, temperature independent | |
| | Enable LED Behavior | |
| | | Condition that would keep parasitic devices alive too long and kill battery life |
| Door Chatter | | |
| | Disable interrupt, enable timer | |
| | Debounce @ sensor before Tx to network coordinator | |
| | Enable LED Behavior | |
| Failed commissioning attempt | | |
| | Commissioning table overflow | |
| | Fail commissioning if RSSI match on two or more wireless end nodes in commissioning mode | |
| | | Brown out and frozen code |
| Power monitor/WDT | | Errors |
| Firmware Update/OTA | OTA Error | |
| | | Wireless end node retains copy of firmware |
| | CRC check | Full image and per packet |
| | Disable all other functionality | |
| Incorrect wireless end node type selection | | Specify a door as fuel etc . . . |
| | Prevent commissioning | |

LED Color Indicator Definition Table

| | |
|---|---|
| Green LED = | Normal |
| Yellow LED = | Possible Installation environment issue, unlikely but possible sensor needs to be replaced |
| Red LED = | Replace sensor |
| Green/Yellow = | Commission |
| Green/Red = | Decommission |
| Yellow/Red = | Firmware update |

Aspects:

It is noted that any of aspects 1-9 below can be combined with any of aspects 10-15.

1. A wireless communication system for a transport refrigeration system of a refrigerated transport unit comprising:

one or more wireless end nodes, each of the one or more wireless end nodes configured to monitor a property of the transport refrigeration system, each of the one or more wireless end nodes including a multicolored light emitting diode;

a network coordinator configured to manage, command, direct and regulate behavior of the one or more wireless end nodes, the network coordinator including a display and a pushbutton;

wherein each of the one or more wireless end nodes are configured to send sensor data to the network coordinator, and wherein the wireless node is configured to indicate diagnostic information of the wireless end node to a user via the multicolored light emitting diode.

2. The wireless communication system of aspect 1, wherein the display of the network coordinator includes a plurality of multicolored light emitting diodes that are configured to indicate diagnostic information of the transport refrigeration system.

3. The wireless communication system of aspect 2, wherein the plurality of light emitting diodes include one or more of a power/status light emitting diode, a proximity pairing light emitting diode, one or more zone status light emitting diodes, a door light emitting diode, a fuel light emitting diode, a temperature light emitting diode, a graphical user interface light emitting diode, an unpair light emitting diode, and one or more modifiable light emitting diodes.

4. The wireless communication system of aspects 1-3, wherein the multicolored light emitting diode is configured to use a combination of different blinking patterns and colors for indicating different diagnostic information of the wireless end node to a user.

5. The wireless communication system of aspects 2-3, wherein the plurality of multicolored light emitting diodes are configured to use a combination of different blinking patterns and colors indicate diagnostic information of the wireless communication system to a user.

6. The wireless communication system of aspects 1-5, wherein the pushbutton of the network coordinator is configured to allow a user to interface with the network coordinator for commissioning the one or more wireless end nodes, obtaining transport refrigeration system diagnostic information.

7. The wireless communication system of aspects 1-6, wherein the network coordinator is configured to provide one or more of: commissioning the one or more wireless end nodes to the wireless communication system; indicating, via the display, a number of wireless end nodes commissioned to a zone of the transport refrigeration system; indicating, via the display, a number of communicating wireless end nodes commissioned to the zone of the transport refrigeration system; indicating, via the display, a lowest link quality of the wireless end nodes commissioned to the zone of the transport refrigeration system; decommissioning one or more of the one or more wireless end nodes from the wireless communication system; indicating, via the display, status information for each of the one or more wireless end nodes; indicating, via the display, power information for each of the one or more wireless end nodes; selecting, via the pushbutton, a configuration for each of the one or more wireless end nodes; and resetting, via the pushbutton, the wireless communication system back to a factory default configuration.

8. The wireless communication system of aspects 1-7, wherein the network coordinator and the one or more wireless end nodes are configured to communicate via a Zigbee communication protocol.

9. The wireless communication system of aspects 1-8, wherein each of the one or more wireless end nodes is one of a door sensor, an air space temperature sensor, a humidity sensor, a cargo temperature sensor and a fuel tank level sensor.

10. A method for commissioning a wireless end node to a wireless communication system of the transport refrigeration system of a refrigerated transport unit, comprising:
   the wireless end node detecting a magnetic swipe pattern;
   the wireless end node sending a commissioning request when the wireless end node detects the magnetic swipe pattern;
   a network coordinator of the transport refrigeration system entering, via a pushbutton of the network coordinator, a discovery mode for commissioning the wireless end node;
   the network coordinator receiving the commissioning request from the wireless end node of the wireless communication system when the network coordinator is in the discovery mode; and
   the network coordinator commissioning the wireless end node to the wireless communication system of the transport refrigeration system.

11. The method of aspect 10, further comprising the wireless end node activating upon detecting a magnetic swipe.

12. The method of aspect 11, further comprising the wireless end node detecting the magnetic swipe pattern when the wireless end node detects a number of magnetic swipes within a time threshold.

13. The method of aspect 12, wherein the number of magnetic swipes is three and the time threshold is six seconds.

14. The method of aspects 11-13, further comprising a multicolored light emitting diode of the wireless end node indicating activation to a user when the magnetic swipe is detected.

15. The method of aspects 10-14, further comprising a multicolored light emitting diode of the wireless end node and a display network coordinator indicating that the wireless end node is commissioned to the wireless communication system of the transport refrigeration system.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A wireless communication system for a transport refrigeration system of a refrigerated transport unit comprising:
   one or more wireless end nodes, each of the one or more wireless end nodes configured to monitor a property of the transport refrigeration system, each of the one or more wireless end nodes including a wireless end node multicolored light emitting diode;
   a network coordinator installed in a control box of the refrigerated transport unit and configured to manage, command, direct and regulate behavior of the one or more wireless end nodes, the network coordinator including a display and a pushbutton;
   wherein each of the one or more wireless end nodes are configured to send sensor data to the network coordinator, and
   wherein each of the wireless end nodes is configured to indicate diagnostic information of the wireless end node to a user via the multicolored light emitting diode,
   wherein the display of the network coordinator includes a plurality of network coordinator multicolored light emitting diodes that are configured to indicate diagnostic information of the transport refrigeration system,
   wherein the plurality of network coordinator multicolored light emitting diodes includes:
      a power/status light emitting diode;
      a proximity pairing light emitting diode;
      one or more zone status light emitting diodes;
      a door light emitting diode;
      a fuel light emitting diode;
      a temperature light emitting diode;
      a graphical user interface light emitting diode;
      an unpair light emitting diode; and
      one or more modifiable light emitting diodes, wherein the plurality of network coordinator multicolored light emitting diodes are configured to use a combination of different blinking patterns and colors to indicate diagnostic information of the wireless communication system to a user, wherein the wireless end node multicolored light emitting diode is configured to use a combination of different blinking patterns and colors to indicate different diagnostic information of the wireless end node to a user including: a commissioning event; a decommissioning event; a firmware update event; and a wireless end node error event, wherein the network coordinator is configured to:
  commission the one or more wireless end nodes to the wireless communication system;
  indicate, via the display, a number of wireless end nodes commissioned to a zone of the transport refrigeration system;
  indicate, via the display, a number of communicating wireless end nodes commissioned to the zone of the transport refrigeration system;
  indicate, via the display lowest link quality of the wireless end nodes commissioned to the zone of the transport refrigeration system;
  decommission one or more of the one or more wireless end nodes from the wireless communication system;
  indicate, via the display, status information for each of the one or more wireless end nodes;
  indicate, via the display, power information for each of the one or more wireless end nodes;
  select, via the pushbutton, a configuration for each of the one or more wireless end nodes; and
  reset, via the pushbutton, the wireless communication system back to a factory default configuration.

2. The wireless communication system of claim 1, wherein the pushbutton of the network coordinator is configured to allow a user to interface with the network coordinator for commissioning the one or more wireless end nodes, obtaining transport refrigeration system diagnostic information.

3. The wireless communication system of claim 1, wherein the network coordinator and the one or more wireless end nodes are configured to communicate via a Zigbee communication protocol.

4. The wireless communication system of claim 1, wherein each of the one or more wireless end nodes is one of a door sensor, an air space temperature sensor, a humidity sensor, a cargo temperature sensor and a fuel tank level sensor.

5. The wireless communication system of claim 1, wherein each of the wireless end nodes is configured to be activated and commissioned based on a plurality of magnetic swipes next to the wireless end node within a set time period.

* * * * *